Sept 29, 1925.                                                    1,555,550
                            J. BUCHLI
        ELECTRIC LOCOMOTIVE FOR MIXED TOOTHED WHEEL AND ADHESION DRIVES
                          Filed Dec. 27, 1923
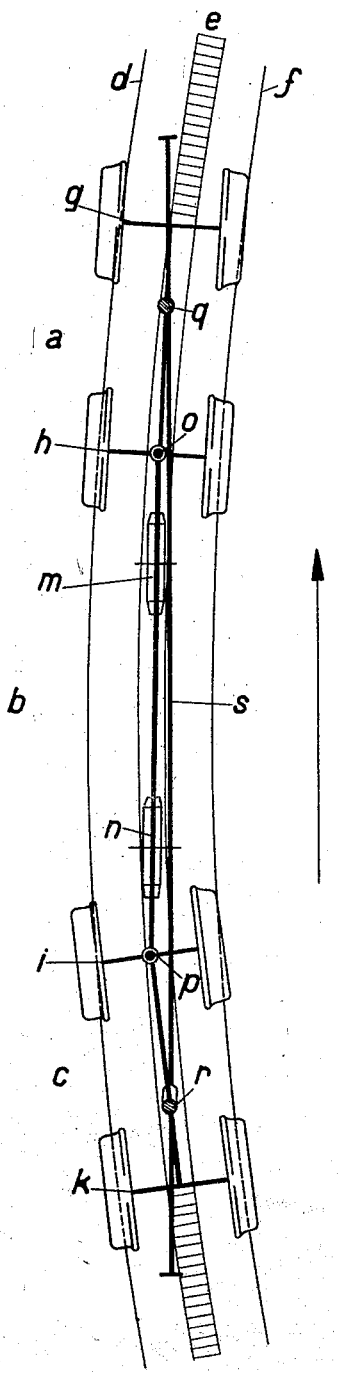
Inventor
J. Buchli
By Marks & Clerk
Attys.

Patented Sept. 29, 1925.

1,555,550

UNITED STATES PATENT OFFICE.

JACOB BUCHLI, OF BADEN, SWITZERLAND, ASSIGNOR TO AKTIENGESELLSCHAFT BROWN, BOVERI AND CIE., OF BADEN, SWITZERLAND.

ELECTRIC LOCOMOTIVE FOR MIXED TOOTHED-WHEEL AND ADHESION DRIVES.

Application filed December 27, 1923. Serial No. 683,063.

*To all whom it may concern:*

Be it known that I, JACOB BUCHLI, a citizen of the Swiss Republic, residing at No. 2 Felsenstrasse, Baden, Switzerland, have invented certain new and useful Improvements in Electric Locomotives for Mixed Toothed-Wheel and Adhesion Drives, of which the following is a specification.

This invention has for its object to provide improved electric locomotives of comparatively heavy type and great tractive power for mixed toothed wheel and adhesion drives capable of running safely on rail tracks of relatively small radii of curvature.

An improved locomotive according to this invention comprises three driving trucks, namely a central truck carrying the toothed wheel drive, and two bogie trucks. The toothed wheel driving truck rests on the two inner axles of the two bogie trucks by means of spherical pivot pins so that each truck is free to execute its natural lateral and vertical movements. At least one of the bogie trucks contains the driving axles for the adhesion drive. The locomotive frame rests on the two pivot pins of the bogie trucks, but not upon the toothed wheel driving truck.

A practical form of an improved locomotive according to this invention is illustrated by way of example in the accompanying drawing which shows diagrammatically the locomotive passing around a curve of the rail track.

As shown, the front axle wheels $g$ and $i$ of the two bogie trucks $a$ and $c$ of the locomotive travelling in the direction of the arrow, roll on the outside adhesion rail $d$, whilst the rear axle wheels $h$ and $k$ adjust themselves in the radial direction; the inside adhesion rail $f$ is relieved of lateral pressure. The middle truck $b$ carrying the toothed wheel drive $m$ and $n$ rests on the axles $h$ and $i$ of the bogie trucks $a$ and $c$ by means of spherical pivot pins $o$ and $p$. The two driving toothed wheels $m$ and $n$ of the central truck $b$ are shifted laterally only a very small distance out of the centre line of the track rack $e$. The spring supported locomotive frame $s$ is carried by the two pivot pins $q$ and $r$ which may be arranged at any suitable points of the bogie frames $a$ and $c$. One of the pivot pins $q$, $r$, must have longitudinal "play" in order to allow a shortening of the three mutually pivotally connected parts $a$, $b$, $c$, to take place relatively to the rigid locomotive frame $s$ when travelling around curves of the rail track. This "play" is indicated in the drawing in the case of the pin $r$.

The electric motor drive may be applied to all three trucks of the locomotive or at least to two of such trucks. The motors are preferably mounted on the spring supported frames and are arranged to work upon the driving axles or the driving toothed wheels through elastic or movable intermediate gearing members. The nature and manner of operation of said intermediate gearing for the motor drive is however not essential for the present invention.

What I claim is:—

1. In an electrical locomotive for mixed toothed wheel and adhesion drives, the combination of a supporting framing comprising three mutually articulated portions of which the central portion comprises only the toothed wheel drive and does not comprise any adhesion driving wheels.

2. In an electrical locomotive for mixed toothed wheel and adhesion drives, the combination of a supporting framing comprising three mutually articulated portions, of which the central portion does not comprise any adhesion driving wheels, but comprises only the toothed wheel drive, resting upon the two inner axles of two bogie trucks by means of two pivot pins.

3. In an electrical locomotive for mixed toothed wheel and adhesion drives, the combination of a supporting framing comprising three mutually articulated portions, of which the central portion does not comprise any adhesion driving wheels, but comprises only the toothed wheel drive, resting upon the two inner axles of two bogie trucks by means of two pivot pins whereof at least one of said bogie trucks comprises the driving axles for the adhesion drive.

4. In an electrical locomotive for mixed toothed wheel and adhesion drives, the combination of a supporting framing comprising three mutually articulated portions, of which the central portion does not comprise any adhesion driving wheels, but comprises only the toothed wheel drive, resting upon the two inner axles of two bogie trucks by means of two pivot pins wherein the spring-supported locomotive frame is supported only by the two outer portions of the locomotive.

5. In an electrical locomotive for mixed toothed wheel and adhesion drives, the combination of a supporting framing comprising three mutually articulated portions, of which the central portion does not comprise any adhesion driving wheels, but comprises only the toothed wheel drive, resting upon the two inner axles of two bogie trucks by means of two pivot pins wherein the spring supported locomotive frame is supported only by the two bogie trucks by means of two pins, of which latter pins one has a certain amount of "play".

In testimony whereof I have signed my name to this specification.

JACOB BUCHLI.